United States Patent [19]

Tanaka et al.

[11] 4,201,175
[45] May 6, 1980

[54] CYLINDER HEAD CONSTRUCTION

[75] Inventors: Kazuyuki Tanaka, Hiroshima; Kazuo Kobayashi, Aki; Itsuro Okabe, Hiroshima; Toshimitsu Tanaka, Kuga, all of Japan

[73] Assignee: Toyo Kogyo Co., Ltd., Aki, Japan

[21] Appl. No.: 940,134

[22] Filed: Sep. 6, 1978

Related U.S. Application Data

[63] Continuation of Ser. No. 795,186, May 9, 1977, abandoned.

[30] Foreign Application Priority Data

May 14, 1976 [JP] Japan .................. 51/55921

[51] Int. Cl.$^2$ .............................................. F02B 23/08
[52] U.S. Cl. ......................... 123/191 M; 123/188 S; 123/193 H
[58] Field of Search ............ 123/32 C, 32 SP, 188 R, 123/188 S, 188 M, 191 M, 191 S, 193 R, 193 CH, 193 CP, 193 H

[56] References Cited

U.S. PATENT DOCUMENTS

| | | | |
|---|---|---|---|
| 2,472,117 | 6/1949 | McGowen | 123/191 M |
| 2,622,579 | 12/1952 | Weslake | 123/191 M |
| 2,737,170 | 3/1956 | McDuffie | 123/191 M |
| 2,800,123 | 7/1957 | Fisher | 123/191 M |
| 3,192,912 | 7/1965 | Stumpfig | 123/191 S |
| 3,766,900 | 10/1973 | Aiti | 123/191 M |

FOREIGN PATENT DOCUMENTS

| | | | |
|---|---|---|---|
| 2359058 | 8/1954 | Fed. Rep. of Germany | 123/193 H |
| 604997 | 7/1948 | United Kingdom | 123/191 M |
| 640734 | 7/1950 | United Kingdom | 123/191 M |

Primary Examiner—Ronald H. Lazarus
Assistant Examiner—Craig R. Feinberg
Attorney, Agent, or Firm—Wenderoth, Lind & Ponack

[57] ABSTRACT

Cylinder head construction defining a hemispheric combustion chamber and including a guide wall facing an intake port to impart swirl to an incoming air-fuel mixture and permit use of a lean air-fuel mixture. The position of the guide wall relative to the cylinder center and relative disposition of the guide wall and a spark plug are made such that although the guide wall is effective in imparting swirl, a flame front may be efficiently propagated to all parts of the combustion chamber subsequent to ignition of the air-fuel mixture therein, whereby provision of the guide wall does not result in increased emission of hydrocarbon compounds in exhaust gas or formation of carbon deposits in the combustion chamber.

4 Claims, 7 Drawing Figures

CYLINDER HEAD CONSTRUCTION

This application is a continuation of application Ser. No. 795,186 filed on may 9, 1977 and is now abandoned.

The present invention relates to an improved cylinder head construction for an internal combustion engine.

In an effort to reduce atmospheric pollution due to exhaust gas of internal combustion engines, there have recently been proposed various types of engines of the so-called lean combustion mixture type in which the air-fuel ratio in the mixture employed in the combustion process is comparatively high. However, making the air-fuel ratio high brings the mixture close to the limit of inflammability on the lean side, and problems of misfiring or knocking are particularly severe in lean mixture engines, in addition to which these engines are noted for low economy and decreased performance.

It is accordingly a principal object of the present invention to provide an improved reciprocating engine cylinder head construction which permits a lean combustion mixture to be employed, but avoids problems of knocking or ignition failure.

It is another object of the present invention to provide a cylinder head construction of the above described type which avoids incomplete combustion of an air-fuel mixture and permits efficient engine performance to be maintained despite use of a lean combustion mixture.

It is a further object of the present invention to provide a cylinder head construction of the above described type which defines a hemispheric combustion chamber to suit to the above described objects.

It is still further object of the present invention to provide a cylinder head construction of the above described type which has a simple construction and can readily be incorporated into internal combustion engines at low cost.

In accomplishing these and other objects, there is provided, according to the present invention, a cylinder head construction which defines a hemispheric combustion chamber. It is known that, when a combustion chamber having this shape is employed, it is possible to locate the spark plug so that once combustion of the air-fuel mixture has started, the flame front has a relatively short distance to travel to burn all parts of the mixture, and there are no remote pockets of gas liable to detonate and cause knocking. To ensure that combustion of the air-fuel mixture will proceed rapidly and completely even when a lean mixture is employed, the invention therefore provides a guide wall which is located near the air intake port and causes the air-fuel mixture to swirl in the combustion chamber, whereby there is produced a suitable degree of turbulence in the charge of the air-fuel mixture. Although such a wall imparts swirl, and therefore, permits effective ignition and improves combustion of the main mass of the charge in a combustion chamber, subsequent to ignition of the charge, the wall is obviously a hindrance to flame-propagation, and it is possible for the wall to create pockets in which combustion of the charge is incomplete, with consequent increased emission of hydrocarbons in the exhaust gas. The inventors accordingly undertook research to determine the optimum disposition of such a guide wall with respect to other elements of the cylinder head. As a result of the research there is provided a cylinder head construction in which suitable swirl is imparted to the air-fuel mixture entering the combustion chamber, but at the same time an increase of the unburned fraction of the mixture and accompanying increase of pollutant emission is prevented.

A better understanding of the present invention may be had from the following full description of several preferred embodiments thereof when read in reference to the attached drawings, in which like numbers refer to like parts, and in which FIG. 1 is a schematic top plan view of a cylinder head according to one preferred embodiment of the invention;

Figure 1:
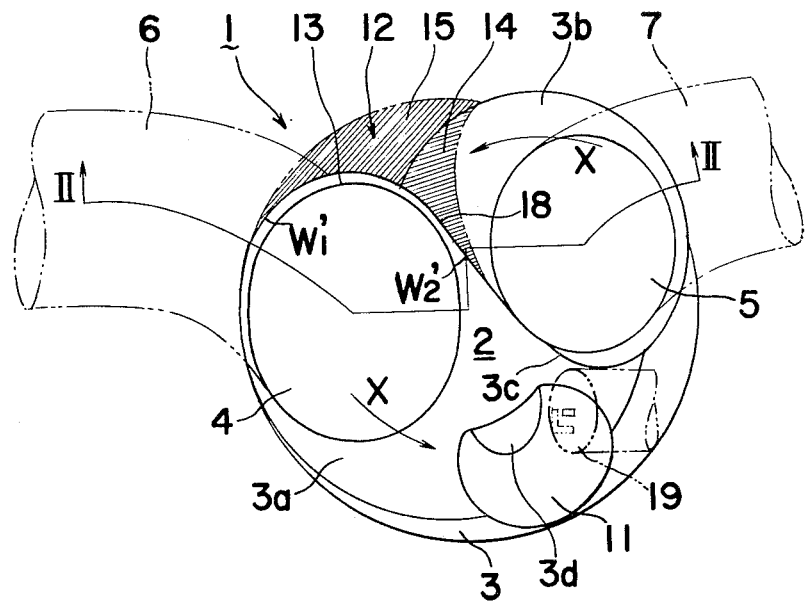
Figure 2:
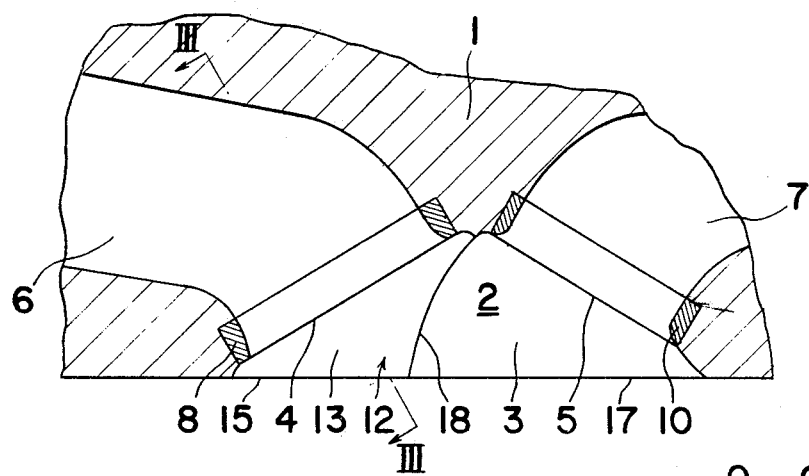
FIG. 2 is a sectional view taken along the line II—II of FIG. 1.
Figure 3:
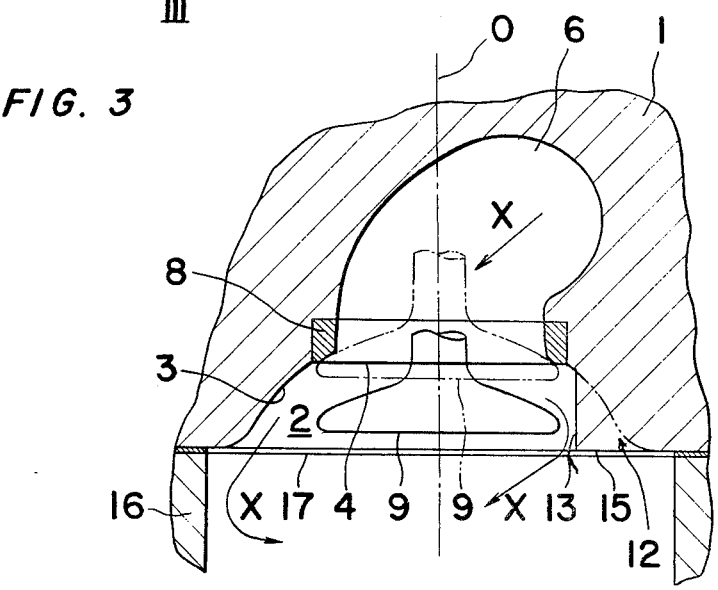
FIG. 3 is a sectional view taken along the line III—III of FIG. 2.

Referring initially to FIGS. 1, 2 and 3, there is shown a cylinder head 1 the inner wall 3 of which defines a generally hemispheric wall portion 3a and a generally hemispheric wall portion 3b having a radius of curvature smaller than that of the wall portion 3a, the wall portions 3a and 3b together defining a so-called multi-hemispheric combustion chamber 2. A mixture of fuel and air constituting a combustion charge is introduced into the combustion chamber 2 via an intake port 4, which is provided in the large-radius wall portion 3a and is connected by a line 6 to a carburetor or similar means.

It should be noted here that the carburetor may be replaced by any other type of fuel supply device which in effect can provide an air-fuel mixture in the line 6, for example, a fuel injection device connected to the line 6.

The intake port 4 is normally closed by a valve 9 (FIG. 3) which is normally seated on a valve seat 8 fitted in the intake port 4 and may be moved in a known manner from the valve seat 8 to open the intake port 4. Waste gases produced as a result of combustion of a charge in the combustion chamber 2 leave the combustion chamber 2 via an exhaust port 5 formed in the small-radius wall portion 3b and connecting to an exhaust gas line 7. An exhaust valve, not shown, is normally seated on a valve seat 10 which is fitted in the exhaust port 5, and is actuated in a known manner to open or close the exhaust port 5 at requisite times.

A charge introduced into the combustion chamber 2 is compressed by piston means (not shown) and is ignited by a spark plug 19 which is provided in a recessed portion 11 defined by the cylinder head inner wall 3. In terms of flow of the air-fuel mixture supplied through the combustion chamber 2, the recessed portion 11 is intermediate the intake port 4 and the exhaust port 5, and, in a top plan view, the intake port 4, the exhaust port 5, and the recessed portion 11 are disposed in a generally triangular arrangement. To ensure that the charge will sweep efficiently over the entire surface of the recessed portion 11, to avoid reduction of swirl imparted to the charge in a manner described below, and at the same time to avoid setting up of excessive turbulence which could hinder the ignition process, the recessed portion 11 is suitably defined as a hemispherical surface having a diameter on the order of from 15 mm to 20 mm, and the spark plug 19 is completely accommodated in the recessed portion 11 and does not project beyond the inner wall 3 of the cylinder head 1. A flat surface 3d is defined in the recessed portion 11 and constitutes a reference surface for determination of effective depth of the combustion chamber 2. The edge portion of the recessed portion 11 is a smooth continuation of the large-radius wall portion 3a.

As shown most clearly by the hatched line portion of FIG. 1, between the intake port 4 and the exhaust port 5 and in terms of the approximate triangle defined by the intake port 4, the exhaust port 5, and the recessed portion 11, there is provided a guide wall or a shroud wall 12 in a position opposite to the recessed portion 11.

In FIGS. 1, 2, and 3, the guide wall 12 has three main wall surfaces and is generally triangular in cross-section. The side wall surface 13 of the guide wall 12 faces the intake port 4. In FIG. 1, the side wall surface 13 comprises a curved portion which is generally parallel to the portion of the periphery of the intake port 4 which is approximately opposite to the portion of the intake port 4 which is toward the recessed portion 11. In FIG. 3, the plane of the main portion of the side wall portion 13 is generally parallel to a central axis 0 of the intake port 4, the axis 0 being the line along which the valve 9 moves during actuation thereof to open or close the intake port 4.

In FIG. 1 the side wall surface 14 of the guide wall 12 which is a smooth continuation of the small-radius wall portion 3b of the combustion chamber 2 faces the exhaust port 5, and is in the shape of a curve substantially equal to that of the small radius wall portion 3b.

In FIGS. 1 and 3, the lower wall surface 15 of the guide wall 12 is almost at the level of the mating surface 17 of the cylinder head 1 with a cylinder block 16, and determines the height of the guide wall 12.

In FIGS. 1 and 2, the junction 18 of the side wall surfaces 13 and 14 of the guide wall 12 is a smooth continuation to the line of junction 3c of the hemispheric wall portions 3a and 3b of the combustion chamber 2.

In FIG. 1, with this construction, when the valve 9 opens, the air-fuel mixtures enters the combustion chamber 2 via the intake port 4, impinges on the guide wall 12, and then follows the curve of the large-radius hemispheric wall portion 3a, as indicated by the arrow X in the drawing, the opposed relationship of the guide wall 12 and the combustion chamber wall portion 3a resulting in swirl being imparted to this flow of the air-fuel mixture. This swirl is increased as the mixture enters the portion of the combustion chamber defined by the wall portion 3b, since the radius of curvature of the wall portion 3b is smaller than that of the wall portion 3a. The air-fuel mixture swirls along the cylinder head inner wall 3 and combustion proceeds efficiently, even for a lean mixture, upon actuation of the spark plug 19 to ignite the mixture.

Swirl of the air-fuel mixture in the combustion chamber may of course be enhanced by making the intake port 4 a directional port, which directs the air-fuel mixture along the periphery of the combustion chamber 2 towards the recessed portion 11.

Although imparting swirl to the air-fuel mixture and ensuring accurate ignition thereof, the guide wall 12 can be the cause of incomplete combustion of the air-fuel mixture. This is for several reasons. One is that in terms of swirl of the whole mass of the air-fuel mixture in the combustion chamber 2, the base of the side wall surface 13 of the guide wall 12, i.e., the portion of the side wall surface 13 which adjoins the cylinder head surface 3, defines a "backwater" portion. Thus, generally when swirl in the charge of the air-fuel mixture exists, the flame propagation is more rapid in the downstream portion than in the upstream portion of the charge, and therefore upstream portions of the charge are liable to remain unburned if discharge is effected immediately subsequent to combustion of the main, downstream portion of the charge. This "backwater" effect is compounded by the quench effect which is liable to occur because the junction of the guide wall 12 with the combustion chamber wall 3 constitutes a greater mass of metal and since temperature in the vicinity of the intake port 4 is generally lower than in the rest of the combustion chamber 2.

Another reason is that the guide wall 12 can act as a physical barrier preventing smooth and efficient penetration of the flame front to all portions of the combustion chamber 2, more particularly to the combustion chamber portion defined within the curve of the inner end portion of the side wall surface 13, i.e., the portion of the side wall surface 13 which is closest to the center of the cylinder head, and to spark plug 19. This problem can of course be resolved by disposing the side wall surface 13 facing the spark plug 19, but in this case, there is practically no opposed relationship between the surface 13 and the peripheral portions of the cylinder surface 3, and there is therefore a great reduction in the strength of the swirl imparted by the guide wall 12.

Figure 4:
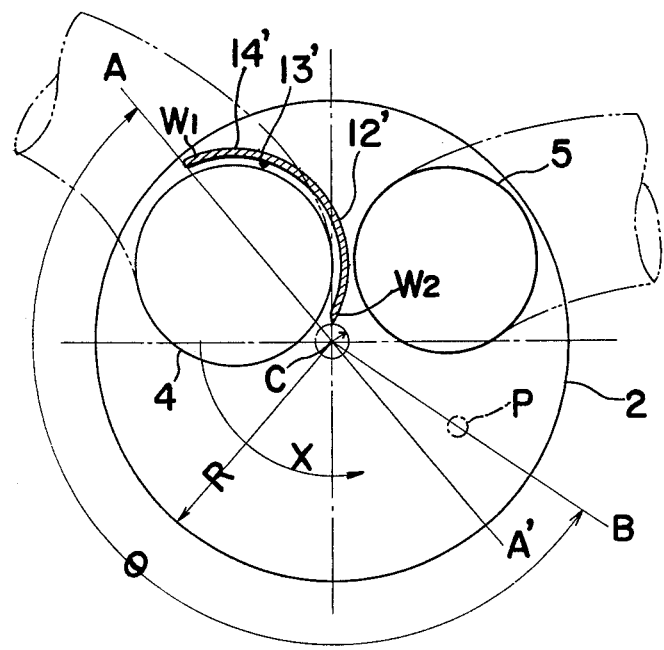
FIG. 4 is an explanatory layout drawing showing undesirable disposition of cylinder head components.

To effect an optimum compromise in meeting different requirements, therefore, disposition of the guide wall 12 is very important. Factors to be considered in positioning the guide wall 12 are illustrated in FIG. 4, to which reference is now had, and which shows details only of the side wall surface 13' of a guide wall 12'. In the description below, angles and circular dimensions noted refer to angles, etc. as seen looking along the axis of the cyliner head, i.e., along a line which passes through a cylinder center C and is normal to the plane of FIG. 4. Defining the end of the side wall surface 13' which is nearest the periphery of the combustion chamber 2 as an outer end W1 and the end thereof which is nearest to the cylinder center C as an inner end W2, when, in terms of flow of the air-fuel mixture through the combustion chamber 2, the position P of the spark plug 19, or more precisely of the center electrode of the spark plug 19, is downstream of the straight line ACA' which is an elongation of the line AC joining the guide wall outer end W1 and the cylinder center C, that is when an angle $\theta$ defined between the line AC and line CB which passes through the cylinder center C and the spark plug position P is large, and when the radius r of the cylinder center circle, defined here as the circle which centers on the cylinder center C and passes through the guide wall inner end W2, is small compared with the radius R of the cylinder, there is extreme slowing of flame propagation towards the side wall surface 13' and the guide wall 12' directly hinders the flame movement, resulting in the above-noted disadvantage of increased hydrocarbon emissions, and also is deposition of carbon sludge, particularly at the outer end W1 portion of the guide wall 12'.

Figure 5:
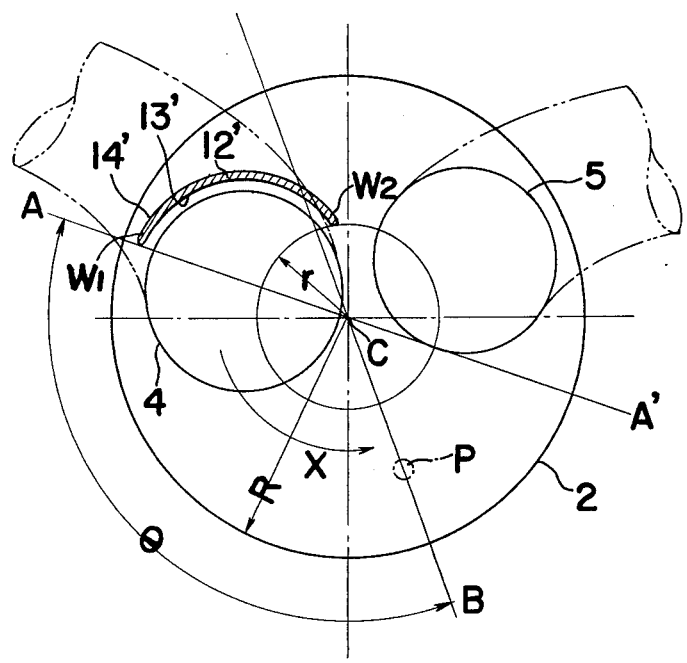
FIG. 5 is a drawing similar to FIG. 4, but shows disposition of cylinder head elements for optimum compromise between achievement of swirl and suppression of pollutant emission.

According to the invention, these disadvantages are overcome by positioning the guide wall 12' and the spark plug 19 so that the radius r of the cylinder center circle is larger and the position P of the spark plug 19 is upstream of the line ACA', i.e., so that the angle ACB is smaller as shown in FIG. 5. Changing the position of the guide wall 12' of course alters the effectiveness thereof in imparting swirl to the incoming air-fuel mixture as noted earlier, and research was therefore undertaken to determine the values of the angle $\theta$ and the radius r which give an optimum compromise with respect to the swirl strength and hydrocarbon emission.

In the research, the swirl strength was determined by means of swirl meters located in combustion chambers and fitted with vane elements the degrees of rotation of which were taken as indicative of the swirl strength.

Figure 6:
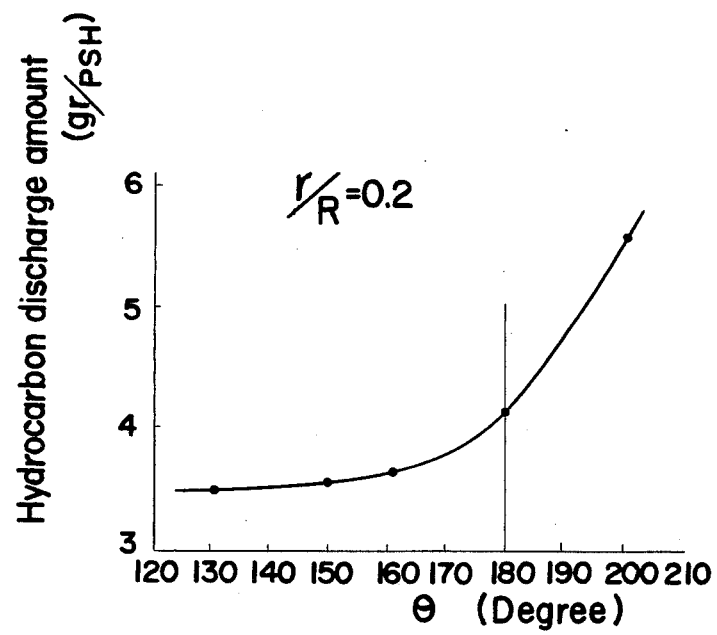
FIG. 6 is a graph plotting the relation of hydrocarbon emission to relative disposition of the inner end of a guide wall and a spark plug.

Referring to FIG. 6, it is seen that when the ratio r/R of the radius of the cylinder center circle to the cylinder radius is 0.2, hydrocarbon emission increase only slightly as the angle $\theta$ is increased from about 120° to 160°, but increase more rapidly as the angle $\theta$ is increase from 160° to 180°, and increase very rapidly for increasing values of the angle $\theta$ above 180°.

Figure 7:
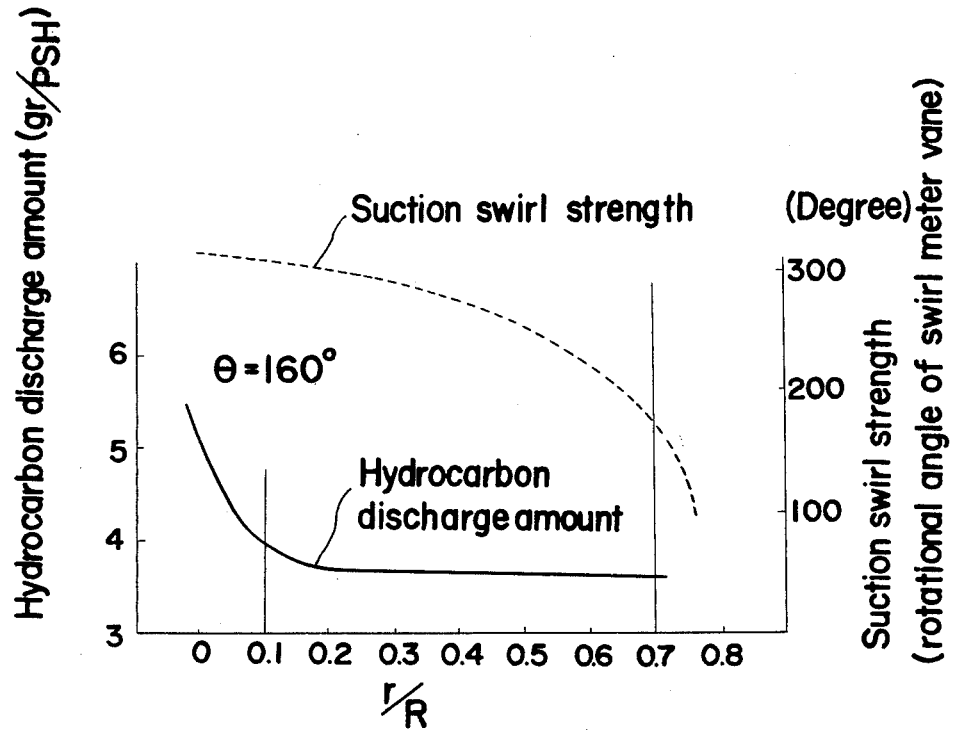
FIG. 7 is a graph plotting the relation of hydrocarbon emission and strength of the air-fuel mixture swirl to the distance of the inner end of a guide wall from the center of a cylinder head.

FIG. 7 plots variation of the swirl strength and hydrocarbon emissions for different values of the ratio r/R when the angle $\theta$ is constant at 160°. From this graph, it is seen that the hydrocarbon emissions are every high for very small values of the ratio r/R, but decrease rapidly as the value of the ratio r/R is increased to 0.1. As the ratio r/R is increased from 0.1 to 0.2., there is a slight decrease of the hydrocarbon emissions, and no appreciable decrease in the hydrocarbon emissions is achieved by increasing the ratio r/R above 0.2. Thus, as far as the hydrocarbon emissions are concerned, the lower limit of the value of the ratio r/R is suitably 0.1 and preferably 0.2, and there is no particular restriction on the upper limit thereof. On the other hand, the swirl strength, which is very high for very small values of the ratio r/R decreases gradually as the ratio r/R is increased to 0.7, and falls rapidly for increased values of the ratio r/R above 0.7. From a consideration of the research results shown in FIGS. 6 and 7, therefore, the optimum range of the values of the ratio r/R is from 0.1 to 0.7 and the angle $\theta$ is suitably less than 180° and ideally in the vicinity of 160°. With proportions and disposition of the guide wall 12' such that these values are achieved, adequate swirl permitting efficient use of a lean air-fuel mixture is achieved, but the presence of the guide wall 12' does not cause increased hydrocarbon emissions.

The swirl strength is also, of course, dependent on the size of the guide wall 12' relative to the effective flow area of the intake port 4, and in general, since the difference of speed of flame propagation in the upstream and downstream portions of an air-fuel mixture increases with increased swirl strength, the angle $\theta$ should be made smaller as the relative size of the wall 12' is increased and the swirl strength is increased.

Movement of the flame front to the area partially enclosed in the curve defined by the side wall surface 13' is further facilitated, and there is also the advantage that air intake may proceed more efficiently at high engine speeds, if the ends of the guide wall 12 progressively slope outwards in the downward direction, i.e., if the portion of the side wall surface 13' which adjoins the cylinder wall 3 is longer than the portion thereof which adjoins the lower wall surface 15. In this case, the outer end W1 and the inner end W2 of the wall 12' are taken as the ends of the wall 12' portion which adjoin the cylinder wall 3. In addition to the wall 12' being so disposed that the abovenoted ranges of the values of the ratio r/R and the angle $\theta$ are maintained, the distance between the side wall surface 13' and the intake valve seat should be made at least 0.2 mm, in order to avoid formation of pockets in which carbon deposits may form.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as being included therein.

What is claimed is:

1. A cylinder head construction which includes:
a mating surface for connection to a cylinder block;
an inner surface defining a multi-hemispheric combustion chamber and having large-radius of curvature wall portion which is provided with an intake port through which an air-fuel mixture enters said combustion chamber and a small-radius of curvature wall portion which is provided with an exhaust port through which exhaust gases produced by combustion of said mixture leave said combustion chamber;
ignition means in said cylinder head for igniting said mixture in said combustion chamber;
valve means actuatable to selectively open and close said intake port and exhaust port, said intake port and exhaust port having valve seats therein on which said valve means are seated; and
guide wall means extending from said inner surface of said cylinder head towards said mating surface and having a first wall surface which faces said intake port and is generally parallel to the periphery of said intake port (and), a second wall surface which faces said exhaust port and curving outwardly from said exhaust port and which is generally smoothly connected with said small-radius of curvature wall portion of said inner surface and extending toward said mating surface in a downward slope to form a junction with a portion of said first wall surface, and a third wall surface which is at the level of said mating surface, said first wall surface of said guide wall means having an inner end closer to the center of the cylinder head than the remainder of said guide wall means and having an outer end adjacent the periphery of the cylinder head adjacent said intake port, said (first wall surface and said second wall surface joining in a) junction (which is) being a smooth continuation of the line of junction of said large-radius and small-radius of curvature wall portions, the ratio of the distance between the inner end of said guide wall means and the center of said cylinder head to the radius of said cylinder head being in the range of 0.1 to 0.7 and the angle defined between a diametrical line extending from the outer end of said guide wall means through the center of said cylinder head and a line extending from said center of the cylinder head to the center of said ignition means, said angle being measured through said large radius of curvature wall portion, is from 180° to an angle less than 180°.

2. A cylinder head construction as claimed in claim 1, wherein said first wall surface is spaced a distance of at least 0.2 mm. from the valve seat of said intake port.

3. A cylinder head construction as claimed in claim 1, wherein said second wall surface is in the shape of a curve substantially equal to that of said small-radius of curvature wall portion.

4. A cylinder head construction as claimed in claim 1, wherein said intake port has a central axis inclined to said mating surface.

* * * * *